United States Patent
Miyazoe et al.

(10) Patent No.: US 6,289,925 B1
(45) Date of Patent: Sep. 18, 2001

(54) REGULATOR

(75) Inventors: Shinji Miyazoe; Hiroyuki Katsuta; Masamichi Tajima, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/496,410

(22) Filed: Feb. 2, 2000

(30) Foreign Application Priority Data

Feb. 22, 1999 (JP) .................................................. 11-043313

(51) Int. Cl.$^7$ .................................................. G05D 16/02
(52) U.S. Cl. .................................................. 137/505.41
(58) Field of Search .............................. 137/505, 505.38, 137/505.39, 505.41, 505.42

(56) References Cited

U.S. PATENT DOCUMENTS

| 221,950 | * | 11/1879 | Woodruff | 137/505.41 |
|---|---|---|---|---|
| 3,369,562 | * | 2/1968 | Caparone et al. | 137/505.41 |
| 3,972,346 | * | 8/1976 | Wormser | 137/505.42 |
| 4,807,849 | | 2/1989 | Morgan . | |
| 5,449,142 | | 9/1995 | Banick . | |
| 5,458,001 | | 10/1995 | Ollivier . | |
| 5,492,146 | | 2/1996 | George et al. . | |
| 5,732,736 | | 3/1998 | Ollivier . | |
| 6,026,850 | | 2/2000 | Newton et al. . | |

FOREIGN PATENT DOCUMENTS

| 0 117 844 | 9/1984 | (EP) . |
|---|---|---|
| 2 099 112 | 12/1982 | (GB) . |

* cited by examiner

Primary Examiner—Stephen M. Hepperle
(74) Attorney, Agent, or Firm—Oblon, Spivak, McClelland, Maier & Neustadt, P.C.

(57) ABSTRACT

The opening and closing operations of a poppet valve are stabilized by preventing a diaphragm and the poppet valve from being inclined so that the pressure adjusting accuracy of a regulator is increased. For that purpose, the diaphragm is fitted with a piston and the poppet valve for opening and closing a valve seat and the piston is guided for moving in the axial direction with a sleeve by slidably inserting the piston into the sleeve.

9 Claims, 4 Drawing Sheets

REGULATOR

TECHNICAL FIELD

The present invention relates to a regulator for adjusting the pressure of pressurized fluid such as compressed air.

BACKGROUND ART

A regulator of this kind introduces pressurized fluid from an inlet port and regulates the pressure thereof to a set point to discharge the fluid from an outlet port. One example thereof is disclosed in U.S. Pat. No. 5,458,001. The regulator comprises a valve seat disposed in a fluid flow path interconnecting the inlet port and the outlet port, a diaphragm movably disposed in the outlet side of the valve seat, a poppet valve connected to the diaphragm for opening and shutting the valve seat from the inlet side by movement of the diaphragm, and a pressure-adjusting spring for urging the diaphragm in the direction that the poppet valve opens the valve seat. The poppet valve opens and shuts the valve seat by an amount of corresponding opening to the acting force difference between the outlet side fluid pressure mutually inversely applied to the diaphragm and the pressure regulating spring force, so that the fluid pressure in the inlet side is reduced to be regulated at a set point.

Since the diaphragm is prone to move not only in the axial direction but also in the direction that the axial line becomes inclined, such regulator has a weakpoint in that the poppet valve connected to the diaphragm is likely to contact and separate from the valve seat in an inclined state thereof so that the opening and shutting operation of the poppet valve is unstable, resulting in the poor accuracy of pressure adjusting. The regulator also has another defect in that localized wear is prone to be produced by contacting and separating from the valve seat of the poppet valve in an inclined state thereof so as to reduce the durability of the regulator.

DISCLOSURE OF INVENTION

A principal technical problem to be solved of the present invention is to stabilize the opening and shutting operations of a poppet valve by preventing a diaphragm and the poppet valve from being inclined to thereby increase the pressure adjusting accuracy of a regulator.

Another technical problem to be solved of the present invention is to eliminate localized wear due to the deviated contact in the regulator so as to increase its durability.

In order to solve the above-mentioned problems, a regulator according to the present invention comprises: a valve seat disposed in a fluid flow path interconnecting the inlet port and the outlet port; a diaphragm disposed in the outlet side of the valve seat; a piston connected to the diaphragm moving along with the diaphragm; a poppet valve attached to the piston for opening and shutting a valve seat hole of the valve sheet from the inlet side; a sleeve slidably containing the piston and guiding the piston so that the axial line thereof does not incline when the piston moves; and a pressure-setting mechanism for setting the outlet pressure.

In the regulator formed as described above, when the piston is pushed down by the pressure-adjusting spring of pressure-setting mechanism to displace the diaphragm toward the valve seat, the poppet valve separates from the valve sheet to open the valve seat hole, so that the pressurized fluid in the inlet side (inlet port) flows into the outlet side (outlet port) via the valve seat hole.

The fluid pressure in the outlet side is exerted on the diaphragm to produce an operating force in the direction opposite to that by the pressure-adjusting spring which in turn causes the poppet valve to open the valve sheet 8 an amount of corresponding opening to the acting force difference therebetween. While the fluid pressure in the outlet side is smaller than the setting-pressure, the poppet valve opens to introduce the pressurized fluid from the inlet toward the outlet. When the fluid pressure in the outlet side increases to reduce the pressure difference with the setting-pressure, the diaphragm moves away from the valve seat, so that the amount of opening of the poppet valve decreases. When the pressure difference is reduced to zero to keep the operating forces in equilibrium, the poppet valve closes to set the fluid pressure in the outlet side.

Since the diaphragm is guided by the sleeve via the piston, the displacement thereof corresponding to the outlet side pressure is securely and steadily performed only in the axial direction without inclination of the axial line or lateral runouts. Accordingly, the poppet valve connected to the diaphragm does not also incline or waggle laterally and is securely displaced only in the axial direction to open and shut the valve seat, thereby resulting in improved accuracy in pressure regulation by the stable and precise opening and shutting operations. Furthermore, since localized wear due to deviated contact cannot be produced, durability can be also increased.

According to a preferred specific embodiment of the present invention, the piston and the sleeve may comprise front-end portions having smaller diameters and rear-end portions having larger diameters, respectively, the piston and the sleeve being slidably in contact with each other in the front-end portions and the rear-end portions, and wherein a step portion may be formed in the inner surface of the sleeve as a stopper so as to abut the rear-end portion of the piston when the piston advances fully.

Therefore, not only can the inclination of the diaphragm be more securely prevented but also when the fluid pressure of the outlet side is suddenly dropped or when the outlet side becomes under zero pressure or vacuum, but also problems in the diaphragm or the piston impacting the valve seat or other members to be damaged or to produce dust can be avoided with reliability.

According to another preferred specific embodiment of the present invention, a regulator may further comprise: a body; and a cover detachably connected to the body, wherein in the body is disposed the inlet port and the outlet port and in the cover is disposed the sleeve, the piston, the diaphragm, and the pressure-setting mechanism. Between the body and the cover, an outer peripheral portion of the diaphragm is hermetically clamped and a plate for fitting the valve seat is provided, and the valve seat is disposed in a clamped state between the plate and the body.

When the outer peripheral portion of the diaphragm is clamped between annular clamping portions formed in the body and the cover from both sides, in order to improve hermeticity, it is desirable that any one surface of those of the clamping portions be planar while a bead be formed on the other.

According to another embodiment of the present invention, the body and the cover may be connected by the clamping ring having a retaining portion retaining at an exterior flange in the outer periphery of the cover and a female thread portion screwed with a male thread portion on the outer periphery of the body, wherein sliding-guiding means are interposed between the retaining portion and the flange of the cover.

According to still another embodiment of the present invention, the pressure-setting mechanism includes a return spring for urging the piston in the direction that the poppet valve closes and the return spring may include at least one of a coil spring and a leaf spring.

When the return spring is a coil spring, the coil spring is disposed within the sleeve between the inner surface of the sleeve and the outer peripheral surface of the piston.

When the return spring is a leaf spring, the leaf spring is formed as an annular ring and the piston is retained at the central portion of the spring while the outer peripheral portion thereof is retained at the body or the cover. Thereby, the leaf spring is closely fitted with in a position of the rear of the diaphragm not obstructing normal deflection of the diaphragm.

According to the present invention, it is preferable that the poppet valve have a conical sealing surface and comprise a flow-restricting portion close to the center of the conical surface in a portion fitting into the valve sheet hole, the conical surface in the flow-restricting portion having a steeply inclined generating line.

Thereby, when the poppet valve opens, the flow-restricting portion gradually shifts out of the valve sheet hole, so that the valve seat hole is prevented from being opened suddenly. When the poppet valve shuts, the valve seat hole is also prevented from being closed suddenly owing to fitting of the flow-restricting portion into the valve seat hole gradually, resulting in reduction of variations in pressure in the outlet side.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

BEST MODE FOR CARRYING OUT THE INVENTION

Figure 1:
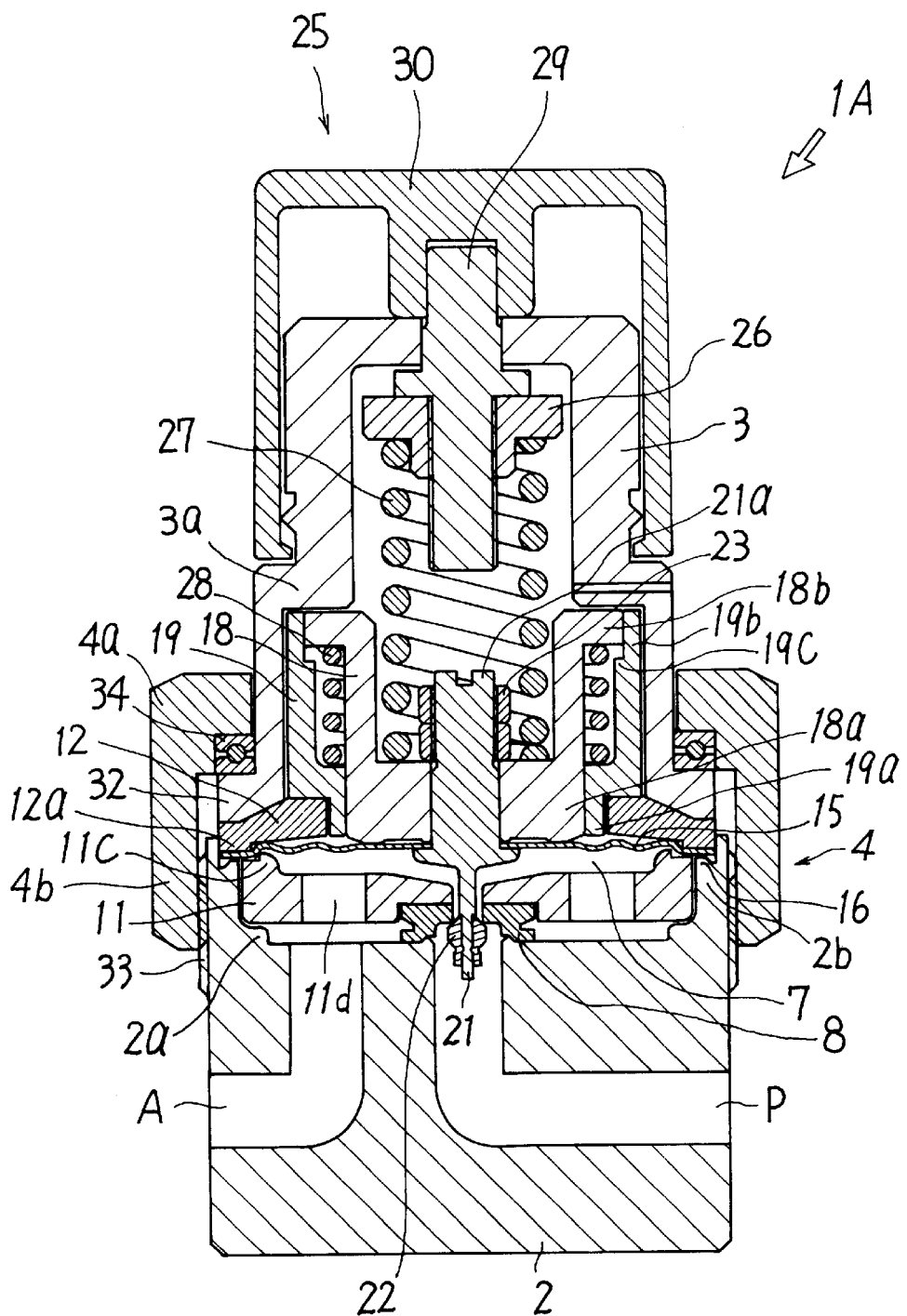
FIG. 1 is a sectional view showing a regulator according to a first embodiment of the present invention.
Figure 2:
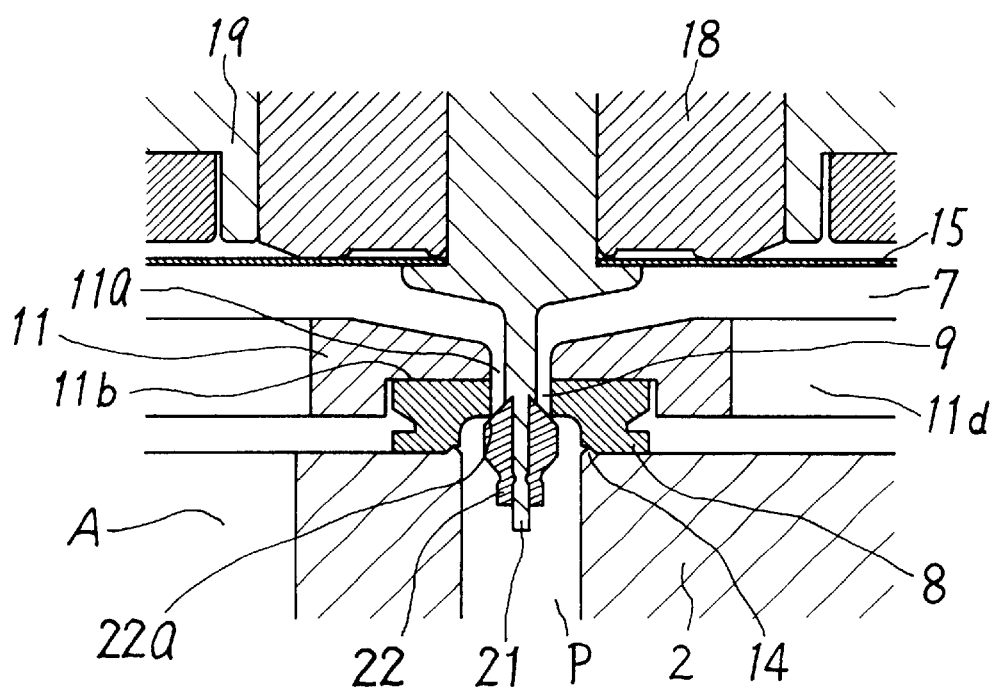
FIG. 2 is an exploded view of an essential part of FIG. 1.

The valve seat 8 is attached via a plate 11. The plate 11 is circular-plate-shaped having a central hole 11a in the center leading to the valve seat hole 9, a circular recess portion 11b surrounding the central hole 11a, and an annular fitting portion 11c in the outer peripheral portion. The plate 11 is attached between the body 2 and the cover 3 by clamping it between a step portion 2a of the body 2 for clamping and an annular clamping portion 12a of a spacer 12 forming a part of the cover 3. Simultaneously, the valve seat 8 is attached in a clamped state between the recess portion 11b of the plate 11 and the body 2. It is desirable that an annular bead 14 be formed on the body 2 to improve hermeticity between the body 2 and the valve seat 8.

In the drawings, numeral 11d indicates through-holes formed in the plate 11 for communicating the outlet side of of the valve seat, which is the pressure chamber 7, with the outlet port "A".

In the outlet side of the valve sheet 8, a diaphragm 15 for defining the top surface of the pressure chamber 7 is attached so as to be movable toward and away from the valve sheet 8. The diaphragm 15 is attached by hermetically clamping its peripheral portion between an annular clamping portion 2b of the outer periphery of the body 2 and the annular clamping portion 12a of the outer periphery of the spacer 12. In order to improve hermetic sealing during the clamping, it is desirable that any one surface of those of the clamping portions 2b and 12a respectively formed on the body 2 and the spacer 12 be planar while a bead 16 be formed on the other. In the example shown in the drawing, the bead 16 is formed on the clamping portion 2b of the body 2.

In the central portion of the back of the diaphragm 15 is fitted with a piston 18 while between a step portion 3a of the cover 3 and the spacer 12 is fixed a sleeve 19. Within the sleeve 19, the piston 18 is slidably accommodated. In the piston 18 and the sleeve 19, front-end portions 18a and 19a having smaller diameters and rear-end portions 18b and 19b having a larger diameter are respectively formed. The piston 18 and the sleeve 19 are slidably made contact with each other in the two portions 18a/19a and 18b/19b, so that the piston 18 is guided so as to be precisely movable only in the axial direction without inclining and lateral runouts. On the inner surface of the sleeve 19 is formed a step portion 19c as a stopper for abutting the rear-end portion 18b when the piston 18 advances fully.

In the central front-end portion of the piston 18, a valve stem 21 is attached so as to protrude from the front surface of the diaphragm 15. The valve stem 21 extends so as to penetrate the valve sheet hole 9 of the valve seat with a poppet valve 22 disposed at one end thereof The poppet valve 22 having a conical sealing surface 22a opens and shuts the valve sheet hole 9 from the inlet side with the sealing surface 22a by the displacement of the diaphragm 15.

Between the back surface of the piston 18 and a spring seat 26, which is one of members forming adjusting means 25, is disposed a pressure-adjusting spring 27 for urging the piston 18 in the opening direction of the poppet valve 22 while within the sleeve 19, between the inner peripheral surface of the sleeve 19 and the outer peripheral surface of the piston 18 is disposed a first return valve 28 for urging the piston 18 in the closing direction of the poppet valve 22. One end of the return valve 28 is retained by the smaller diameter front-end portion 19a of the sleeve 19 while the other end thereof is retained by the larger diameter rear-end portion 18b of the piston 18. Further the pressure-adjusting spring 27 on the return valve 28 can be formed as a coil spring.

The adjusting means 25 comprises an adjusting screw 29 rotatably disposed in the central end portion of the cover 3, the above-mentioned spring seat 26 screwed to the adjusting screw 29 and movable by the rotation of the adjusting screw 29, and a dial 30 for rotationally operating the adjusting screw 29 from the outside of the cover 3. The adjusting means 25 establishes the outlet fluid pressure by adjusting the urging force of the pressure-adjusting spring 27 and constitutes a pressure setting mechanism along with the pressure-adjusting spring 27 and the return valve 28.

The above-mentioned clamping ring 4 interconnecting the body 2 and the cover 3 comprises an annular retaining portion 4a rotatably retained at an exterior flange 32 of the cover 3 in the peripheral end portion thereof and a female thread portion 4b screwed with a male thread portion 33 of the body 2 in its outer periphery. Between the retaining portion 4a and the flange 32 of the cover 3, sliding-guiding means 34 formed of a bearing, etc., are interposed.

In the regulator 1A configured as above, when the piston 8 is pushed down by the pressure-adjusting spring 27 to displace the diaphragm 15 toward the valve sheet 8, the poppet valve 22 separates from the valve seat 8 to open the valve seat hole 9, so that the pressurized fluid in the inlet side (inlet port "P") flows into the outlet side (outlet port "A") via the valve sheet hole 9.

The fluid pressure in the outlet side is exerted on the diaphragm 15 to produce an operating force in the direction opposite to that by the pressure-adjusting spring 27 which in turn causes the poppet valve 22 to open the valve seat 8 by an amount of corresponding opening to the acting force difference therebetween. While the fluid pressure in the outlet side is smaller than the setting-pressure, the poppet valve 22 opens to introduce the pressurized fluid from the inlet toward the outlet. When the fluid pressure in the outlet side increases to reduce the pressure difference with the setting-pressure, the diaphragm 15 moves away from the valve seat 8, so that the amount of opening of the poppet valve 22 decreases. When the pressure difference is reduced to zero to keep the operating forces in equilibrium, the poppet valve 22 closes to set the fluid pressure in the outlet side.

Since the diaphragm 15 is guided by the sleeve 19 via the piston 18, the displacement thereof corresponding to the outlet side pressure is securely and steadily performed only in the axial direction without inclination of the axial line or lateral runouts. In particular, since the piston 18 and the sleeve 19 slidably make contact with each other in a plural of portions thereof such as front-end portions 18a and 19a and rear-end portions 18b and 19b, the sliding is stable and inclination of the axial line can be securely prevented. Accordingly, the poppet valve 22 connected to the diaphragm 15 does not also incline or waggle laterally and is securely displaced only in the axial direction to open and shut the valve sheet 8, thereby resulting in improved accuracy in pressure regulation by the stable and precise opening and shutting operations. Furthermore, since localized wear due to deviated contact cannot be produced, the durability can be also increased.

Since the full advancing position of the piston 18 is defined by the step portion 19c formed on the inner surface of the sleeve 19, even when the fluid pressure of the outlet side is suddenly dropped or when the outlet side becomes under zero pressure or vacuum, problems in that the diaphragm 15 or the piston 18 impacts with the valve seat 8 or other members so as to be damaged or to produce dust can be avoided with reliability.

Figure 3:
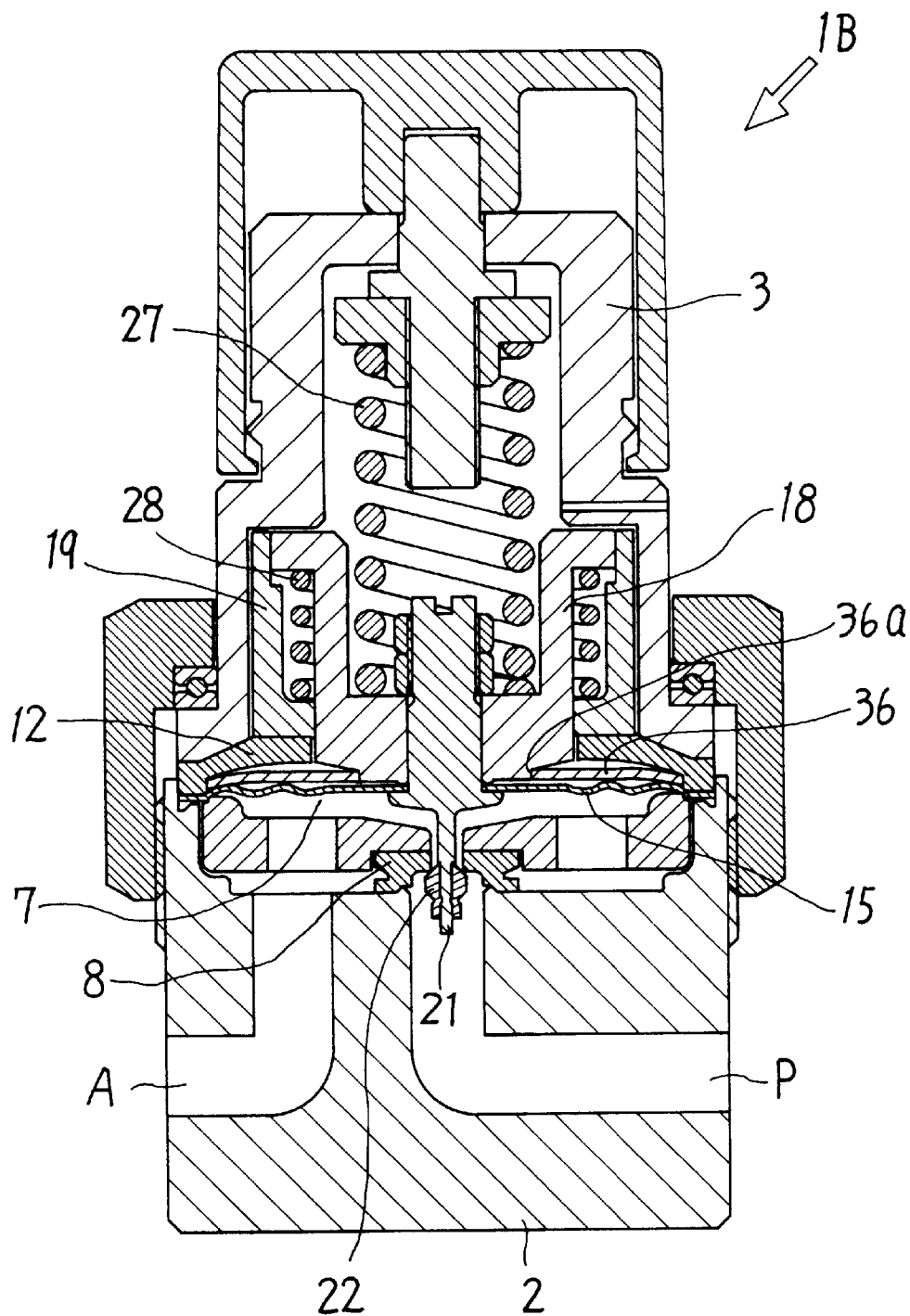
FIG. 3 is a sectional view showing a regulator according to a second embodiment of the present invention.

FIG. 3 shows a second embodiment of the present invention. A point of difference of a regulator 1B according to the second embodiment from the above-mentioned regulator 1A according to the first embodiment is that a second return spring 36 formed of a leaf spring is disposed therein besides the first return spring 28 formed of a coil spring.

The leaf spring is formed in an annular ring and the front-end portion of the piston 18 is fitted into and retained at the central hole 36a of the spring while the outer peripheral portion thereof is retained at the inner peripheral surface of the spacer 12. Thereby, the leaf spring is closely fitted with in a position of the rear of the diaphragm 15 not obstructing normal deflection of the diaphragm 15.

The second return spring 36 also has a function that when the diaphragm 15 is strongly urged by fluid pressure, excess deflection thereof is prevented by supporting it from the rear besides the function of urging the piston 18 in the returning direction in cooperation with the first return spring 28.

In addition, when such the leaf spring-type second return spring 36 is provided, the first return spring 28 formed of a coil spring may be eliminated.

Since the configuration except the above point is substantially the same as that of the regulator 1A according to the first embodiment, like reference characters designate like principal portions common to those of the first and second embodiments, and description thereof is abbreviated.

Figure 4:
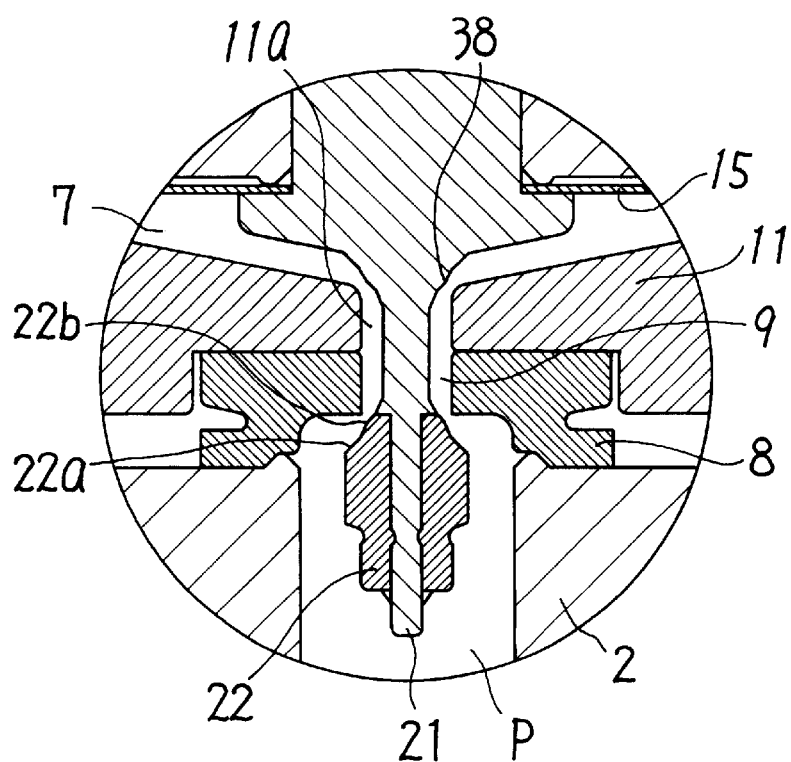
FIG. 4 is a sectional view of an essential part of a regulator according to a third embodiment of the present invention.

FIG. 4 shows an essential part of a regulator according to a third embodiment. In the regulator according to the third embodiment, a flow-restricting portion is formed in the poppet valve 22 according to above-mentioned each embodiment. That is, in a portion close to the center (inside), i.e., a portion fitting into the valve sheet hole 9, on the conical sealing surface 22a of the poppet valve 22, a flow-restricting portion 22b, in which a generating line is steeply inclined, is formed.

When the poppet valve 22 opens, the valve seat hole 9 is gradually opened owing to the flow-restricting portion 22b so that pressurized fluid is prevented from flowing into the pressure chamber 7 suddenly. When the poppet valve shuts, the valve seat hole 9 is also gradually closed owing to the flow-restricting portion 22b so that pressurized fluid is prevented from being suddenly intercepted. Consequently, not only sudden variations in pressure accompanied with opening and shutting of the poppet valve 22 are prevented but also enfolding dust due to sudden variations in flow, losing flow uniformity due to generation of turbulence, and so forth can be securely avoided.

The flow-restricting portion described as above may also be formed in the outlet side of the valve seat 8. That is, as shown in FIG. 4, the flow-restricting portion 38 having a conical surface may be formed in a portion of the base end side of the valve stem 21 located in the pressure chamber 7, so that the opening area of the central hole 11a of the plate 11 is throttled by the flow-restricting portion 38 when the poppet valve 22 is fully opened.

In this manner, by forming the flow-restricting portion 38 in the outlet side of the valve seat 8, the flow when the poppet valve 22 is fully opened is restricted so that sudden variations in pressure can be more effectively prevented. That is, when fluid pressure in the outlet side is largely reduced and thereby the poppet valve 22 is fully opened to supply the maximum flow, enfolding dust due to sudden variations in flow, losing flow uniformity due to generation of turbulence are prone to be generated. However, the pressure rises smoothly because the opening area of the central hole 11a is throttled by the flow-restricting portion 38 to restrict the flow.

In addition, the flow-restricting portion 38 may be jointly formed with the flow-restricting portion 22b in the poppet valve 22 or may be formed instead of the flow-restricting portion 22b.

As described above, according to the present invention, since the piston attached to the diaphragm is guided by the sleeve, the diaphragm securely and steadily displaces only in the axial direction; the axial line cannot be inclined; and lateral runouts cannot be generated, thereby preventing the poppet valve from inclination and lateral runouts to stabilize its opening and shutting operations, resulting in not only increasing pressure-adjusting-accuracy of the regulator but also improving its durability by preventing localized wear due to the deviated contact of the poppet valve.

What is claimed is:

1. A regulator comprising:
   an inlet port for introducing pressurized fluid;
   an outlet port for discharging pressure-regulated pressurized fluid;
   a valve seat disposed in a fluid flow path interconnecting said inlet port and said outlet port and having a hole formed thereon;

a diaphragm disposed in an outlet side of said valve seat so as to be movable toward and away from said valve seat;

a piston connected to a rear central portion of said diaphragm for moving in an axial direction along with said diaphragm;

a valve stem protruding from an end portion of said piston toward a front portion of said diaphragm and extending so as to penetrate the hole in said valve seat;

a poppet valve disposed in the end portion of said valve stem for opening and shutting the valve sheet hole from an inlet side by the movement of said diaphragm;

a sleeve slidably containing said piston and guiding a displacement of said piston in an axial direction; and a pressure-setting mechanism further comprising a pressure-adjusting spring for urging said piston in a direction such that said poppet valve opens, a return spring for urging said piston in a direction such that said poppet valve closes, and an adjusting mechanism for adjusting an urging force of the pressure-adjusting spring;

wherein said piston and said sleeve comprise front-end portions having smaller diameters and rear-end portions having larger diameters, respectively, said piston and said sleeve being slidably in contact with each other in the front-end portions and the rear-end portions, and wherein a step portion is formed in an inner surface of said sleeve as a stopper so as to abut the rear-end portion of said piston when said piston advances fully.

2. A regulator according to claim 1, further comprising: a body; and a cover detachably connected to said body by a nut-type clamping ring, wherein in said body is disposed said inlet port and said outlet port and in said cover is disposed said sleeve, said piston, said diaphragm, and said pressure-setting mechanism, and between said body and said cover, an outer peripheral portion of said diaphragm is hermetically clamped, and a plate having a central hole and a recess portion around the central hole is provided, and wherein said valve seat is disposed in a clamped state between the recess portion of the plate and said body.

3. A regulator according to claim 2, wherein any one of annular clamping portions respectively formed on said body and said cover for clamping the outer peripheral portion of said diaphragm from both sides is planar and a bead is formed on the other.

4. A regulator according to claim 2, wherein the clamping ring has a retaining portion retaining rotatably to an exterior flange in the outer peripheral end portion of said cover and a female thread portion screwed with a male thread portion on the outer periphery of said body, wherein sliding-guiding means are interposed between the retaining portion and the flange of said cover.

5. A regulator according to claim 1, wherein the return spring includes at least one of a first return spring formed of a coil spring and a second return spring formed of a leaf spring.

6. A regulator according to claim 1, wherein said poppet valve having a conical sealing surface comprises a flow-restricting portion close to the center of the conical surface in a portion fitting into the valve sheet hole, the conical surface in the flow-restricting portion having a steeply inclined generating line.

7. A regulator comprising:

an inlet port for introducing pressurized fluid;

an outlet port for discharging pressure-regulated pressurized fluid;

a valve seat disposed in a fluid flow path interconnecting said inlet port and said outlet port and having a hole formed thereon;

a diaphragm disposed in an outlet side of said valve seat so as to be movable toward and away from said valve seat;

a piston connected to a rear central portion of said diaphragm for moving in an axial direction along with said diaphragm;

a valve stem protruding from an end portion of said piston toward a front portion of said diaphragm and extending so as to penetrate the hole in said valve seat;

a poppet valve disposed in the end portion of said valve stem for opening and shutting the valve sheet hole from an inlet side by the movement of said diaphragm;

a sleeve slidably containing said piston and guiding a displacement of said piston in an axial direction; and a pressure-setting mechanism further comprising a pressure-adjusting spring for urging said piston in a direction such that said poppet valve opens, a return spring for urging said piston in a direction such that said poppet valve closes, and an adjusting mechanism for adjusting an urging force of the pressure-adjusting spring, wherein the return spring includes at least one of a first return spring formed of a coil spring and a second return spring formed of a leaf spring.

8. A regulator according to claim 7, wherein the return spring includes at least the first return spring formed of a coil spring, the first return spring disposed within said sleeve between the inner peripheral surface of said sleeve and the outer peripheral surface of said piston, one end of the first return spring being retained at the rear-end portion having a lager diameter of said piston while the other end thereof being retained at the front-end portion having a smaller diameter of said sleeve.

9. A regulator according to claim 7, wherein the return spring includes at least the second return spring formed of an annular leaf spring, wherein the second return spring is closely disposed to the rear of said diaphragm in a position not obstructing normal deflection of said diaphragm by retaining the central portion of the second return spring to said piston and also by retaining the outer peripheral portion thereof to one of said body and said cover.

* * * * *